(12) United States Patent
Mori et al.

(10) Patent No.: US 9,648,200 B2
(45) Date of Patent: May 9, 2017

(54) IMAGE PROCESSING SYSTEM STORING RECEIVED IMAGE DATA IN FOLDER, IMAGE PROCESSING METHOD, AND STORAGE MEDIUM

(71) Applicant: CANON KABUSHIKI KAISHA, Tokyo (JP)

(72) Inventors: Ryuta Mori, Nagareyama (JP); Fumitoshi Ito, Kawasaki (JP); Daijiro Miyamoto, Kawasaki (JP); Makiya Tamura, Tokyo (JP); Natsuki Kato, Kawasaki (JP); Shuuhei Kawakami, Higashiyamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/223,768

(22) Filed: Mar. 24, 2014

(65) Prior Publication Data
US 2014/0293361 A1 Oct. 2, 2014

(30) Foreign Application Priority Data
Mar. 26, 2013 (JP) .................................. 2013-065035

(51) Int. Cl.
| H04N 1/00 | (2006.01) |
| G06F 3/12 | (2006.01) |
| G06F 7/00 | (2006.01) |
| H04N 1/32 | (2006.01) |

(52) U.S. Cl.
CPC . *H04N 1/32379* (2013.01); *H04N 2201/0094* (2013.01); *H04N 2201/21* (2013.01); *H04N 2201/214* (2013.01)

(58) Field of Classification Search
None
See application file for complete search history.

(56) References Cited

U.S. PATENT DOCUMENTS

| 5,771,280 | A | * | 6/1998 | Johnson | .................. H04L 29/06 |
| | | | | | 379/201.06 |
| 5,832,470 | A | * | 11/1998 | Morita | ................ G06F 17/3071 |
| 6,147,773 | A | * | 11/2000 | Taylor | .................. G06Q 10/107 |
| | | | | | 358/400 |
| 6,678,705 | B1 | * | 1/2004 | Berchtold | ......... G06F 17/30011 |

(Continued)

FOREIGN PATENT DOCUMENTS

| JP | 2004-048214 A | 2/2004 |
| JP | 2009-188580 A | 8/2009 |
| JP | 2009-290730 A | 12/2009 |

*Primary Examiner* — Madelein Nguyen
(74) *Attorney, Agent, or Firm* — Canon USA Inc., IP Division

(57) ABSTRACT

An image processing system includes a memory unit configured to store an address book to be used for setting a transmission destination of image data, a receiving unit configured to receive the image data, an acquisition unit configured to acquire a name that is registered in the address book in association with information of a transmission source of the image data received by the receiving unit, a setting unit configured to set a folder path for a plurality of hierarchies which includes a folder with the name acquired by the acquisition unit, and a storage unit configured to store the image data received by the receiving unit in a folder indicated by the folder path that is set by the setting unit.

9 Claims, 18 Drawing Sheets

(56) References Cited

U.S. PATENT DOCUMENTS

| | | | |
|---|---|---|---|
| 6,718,535 B1* | 4/2004 | Underwood | G06F 9/4443 717/101 |
| 7,130,066 B1* | 10/2006 | Kanematu | 358/1.15 |
| 7,304,759 B2* | 12/2007 | Kiyono et al. | 358/1.15 |
| 7,532,340 B2* | 5/2009 | Koppich | G06F 17/30011 358/1.15 |
| 7,617,279 B2* | 11/2009 | Nakajima et al. | 709/204 |
| 7,855,803 B2* | 12/2010 | Nomoto | G06F 17/30126 358/1.16 |
| 8,015,319 B2* | 9/2011 | Tian | H04L 61/1582 709/248 |
| 8,089,653 B2* | 1/2012 | Kobashi | 358/1.18 |
| 8,214,387 B2* | 7/2012 | King et al. | 707/770 |
| 8,593,661 B2* | 11/2013 | Shimizu | H04N 1/00244 358/1.15 |
| 2001/0034771 A1* | 10/2001 | Hutsch | G06F 9/541 709/217 |
| 2002/0181017 A1* | 12/2002 | Such et al. | 358/1.15 |
| 2003/0023435 A1* | 1/2003 | Josephson | G10L 15/26 704/235 |
| 2003/0035141 A1* | 2/2003 | Ilda | 358/1.15 |
| 2003/0063326 A1* | 4/2003 | Kiyono | H04N 1/32128 358/440 |
| 2003/0126136 A1* | 7/2003 | Omoigui | G06F 17/3089 |
| 2004/0044725 A1* | 3/2004 | Bell | H04W 4/00 709/203 |
| 2004/0148338 A1* | 7/2004 | Saare | G06F 17/3089 709/203 |
| 2004/0186820 A1* | 9/2004 | Izume | G06F 17/3028 |
| 2004/0267595 A1* | 12/2004 | Woodings | G06Q 10/06 705/7.14 |
| 2005/0289109 A1* | 12/2005 | Arrouye | G06F 17/301 |
| 2006/0020615 A1* | 1/2006 | Keohane | G06F 17/30882 |
| 2006/0036568 A1* | 2/2006 | Moore | G06F 17/30126 |
| 2006/0072144 A1* | 4/2006 | Dowling et al. | 358/1.15 |
| 2006/0080393 A1* | 4/2006 | Cardone | H04L 51/28 709/206 |
| 2006/0087683 A1* | 4/2006 | King et al. | 358/1.15 |
| 2007/0133050 A1* | 6/2007 | Kitada et al. | 358/1.15 |
| 2007/0226204 A1* | 9/2007 | Feldman | G06F 17/30958 |
| 2007/0240096 A1* | 10/2007 | Pontoppidan | G06F 8/71 717/101 |
| 2007/0260809 A1* | 11/2007 | Hara | H04N 1/00236 711/101 |
| 2008/0016090 A1* | 1/2008 | Fukata | G06F 3/048 |
| 2008/0068647 A1* | 3/2008 | Isobe et al. | 358/1.15 |
| 2008/0100875 A1* | 5/2008 | Takenoshita et al. | 358/403 |
| 2008/0141163 A1* | 6/2008 | Kira | G06F 3/0482 715/781 |
| 2008/0195588 A1* | 8/2008 | Kim | G06F 17/30867 |
| 2009/0019392 A1* | 1/2009 | Nomura | G06F 17/30274 715/810 |
| 2009/0141304 A1* | 6/2009 | Suzuki | 358/1.15 |
| 2009/0237728 A1* | 9/2009 | Yamamoto | 358/1.15 |
| 2010/0027777 A1* | 2/2010 | Gupta | H04M 3/42195 379/210.01 |
| 2010/0070448 A1* | 3/2010 | Omoigui | H01L 27/1463 706/47 |
| 2010/0092095 A1* | 4/2010 | King et al. | 382/229 |
| 2010/0182631 A1* | 7/2010 | King et al. | 358/1.15 |
| 2010/0205196 A1* | 8/2010 | Schreiber | G06Q 30/0273 707/758 |
| 2011/0096360 A1* | 4/2011 | Fujita et al. | 358/1.15 |
| 2011/0170136 A1* | 7/2011 | Zakarian et al. | 358/1.15 |
| 2011/0267653 A1* | 11/2011 | Yamamoto | 358/1.15 |
| 2011/0292432 A1* | 12/2011 | Matsusaka | 358/1.14 |
| 2012/0023180 A1* | 1/2012 | Fukuoka | G06Q 10/10 709/206 |
| 2012/0221569 A1* | 8/2012 | Sato | G06F 19/3412 707/736 |
| 2012/0313966 A1* | 12/2012 | Kamekawa | G06F 17/2241 345/619 |
| 2013/0212200 A1* | 8/2013 | Dennis | H04L 51/22 709/206 |
| 2013/0217365 A1* | 8/2013 | Ramnani | H04L 67/306 455/414.1 |
| 2014/0002856 A1* | 1/2014 | Shimizu | 358/1.15 |
| 2014/0016163 A1* | 1/2014 | Shimizu | G06F 3/1288 358/1.15 |
| 2014/0253971 A1* | 9/2014 | Tonegawa | 358/1.15 |
| 2014/0293361 A1* | 10/2014 | Mori | H04N 1/32379 358/403 |
| 2015/0081702 A1* | 3/2015 | Kato | H04L 67/1097 707/736 |

* cited by examiner

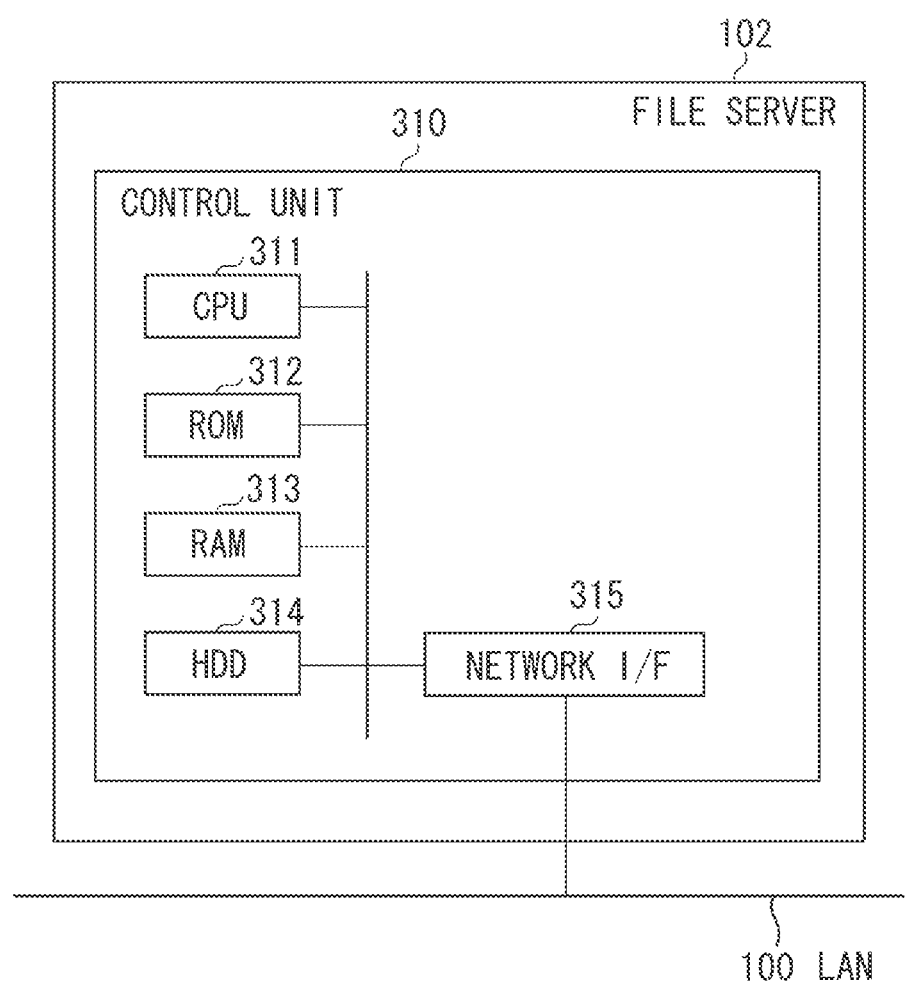

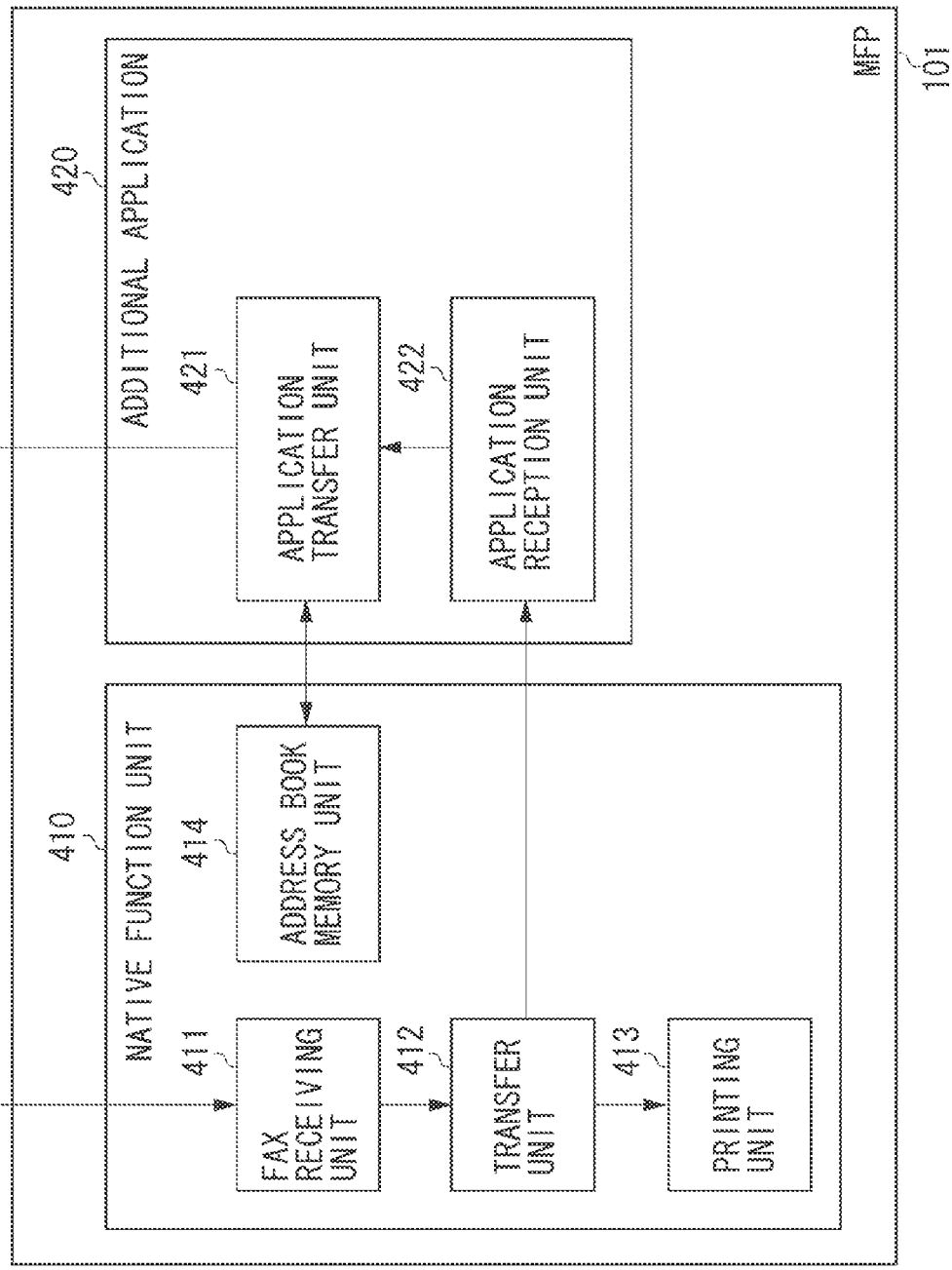

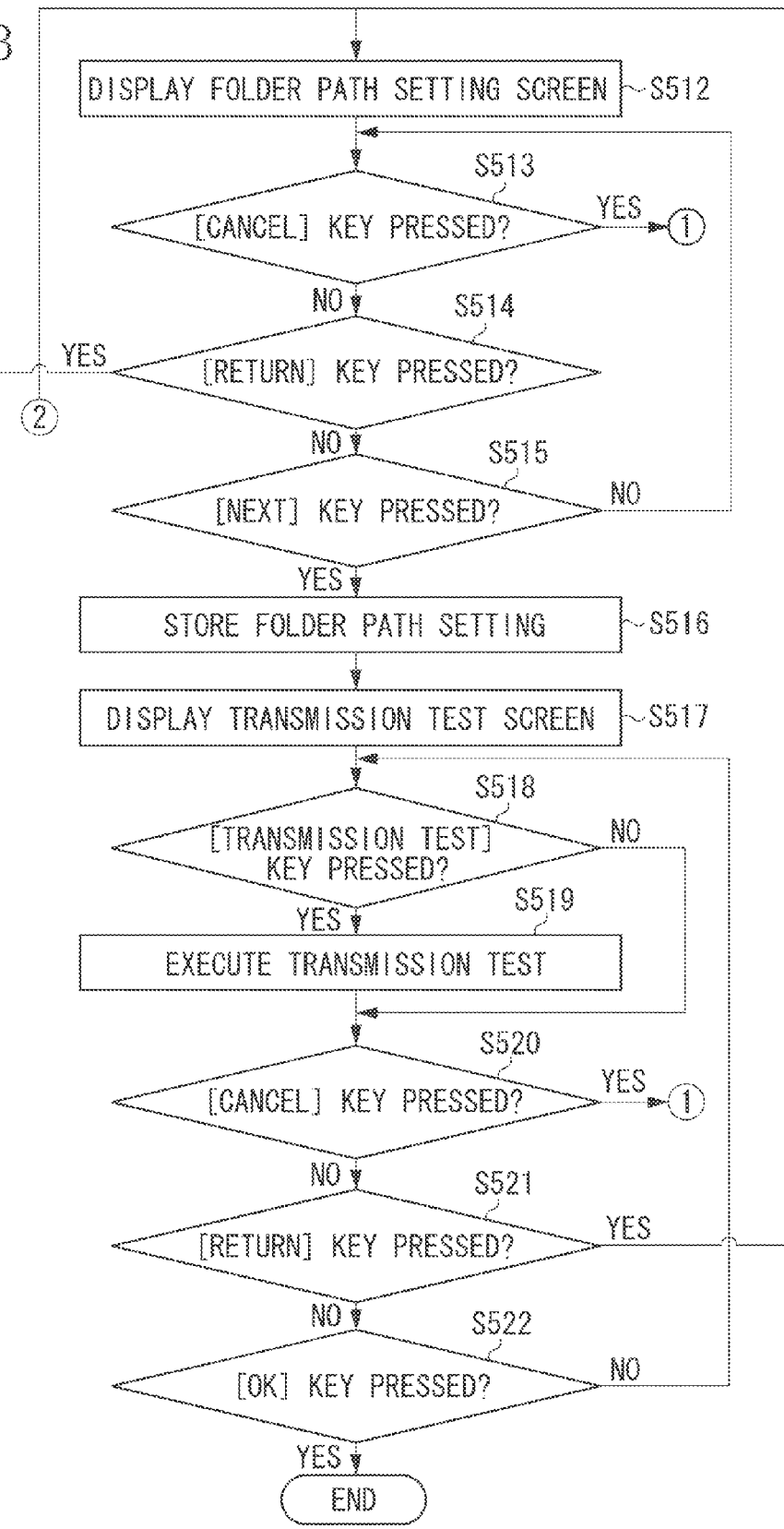

FIG. 11

1100 TRANSFER SETTING

```
hostname, sharedserver ~1101
folderpath, root/ ~1102
username, administrator ~1103
password, 32942xc45 ~1104
filenamerule, [REGISTNAME]_[FAXNUMBER]_[DATE&TIME] ~1105
folderrule, [REGISTNAME]/[FAXNUMBER]/[DATE] ~1106
```

FIG. 12

| DESTINATION ADDRESS ID (1201) | NAME (1202) | FAX NUMBER (1203) |
|---|---|---|
| 0001 | ABC-CORPORATION | 0311112222 |
| 0002 | X-COMPANY LIMITED | 0333334444 |
| 0003 | Y-REAL ESTATE CORPORATION | 0355556666 |
| 0004 | Z-OFFICE | 0377778888 |
| ... | ... | ... |

1200 ADDRESS BOOK

IMAGE PROCESSING SYSTEM STORING RECEIVED IMAGE DATA IN FOLDER, IMAGE PROCESSING METHOD, AND STORAGE MEDIUM

BACKGROUND OF THE INVENTION

Field of the Invention

The present invention relates to an image processing system that stores received image data in a folder, an image processing method, and a storage medium.

Description of the Related Art

Conventionally, there has been known a function for automatically transferring image data received using a facsimile apparatus, such as a group 3 (G3) facsimile or an internet facsimile apparatus, to a preset transfer destination. If a file server is specified as a transfer destination of the image data, the received image data can be automatically stored in a folder within the file server.

Japanese Patent Application Laid-Open No. 2009-290730 discusses a method for automatically storing the image data received by facsimile in a folder by registering information of a transmission source of the facsimile and a folder that serves as a storage destination of the image data in association with each other. With this configuration, for example, if a transmission source A is associated with a folder A whereas a transmission source B is associated with a folder B, image data received from the transmission source A is automatically stored in the folder A, whereas image data received from the transmission source B is automatically stored in the folder B.

According to the method discussed in Japanese Patent Application Laid-Open No. 2009-290730, the image data can be sorted and stored in a plurality of folders according to the transmission source. However, with the method discussed in Japanese Patent Application Laid-Open No. 2009-290730, it is necessary to individually register a combination of the transmission source and the folder by the number of transmission sources. Accordingly, the registration will take more time and effort as the number of transmission sources increases. Further, in a case where a facsimile is received from an unregistered transmission source, the image data thereof will not be stored in a folder. Furthermore, when the user makes a setting for storing the image data in a folder arranged hierarchically, it will take more time and effort because the user has to input a folder name of each hierarchy letter-by-letter.

SUMMARY OF THE INVENTION

The present invention is directed to an image processing system capable of easily executing settings for sorting and storing received image data in a plurality of folders.

According to an aspect of the present invention, an image processing system includes a memory unit configured to store an address book to be used for setting a transmission destination of image data, a receiving unit configured to receive image data, an acquisition unit configured to acquire a name that is registered in the address book in association with information of a transmission source of the image data received by the receiving unit, a setting unit configured to set a folder path for a plurality of hierarchies which includes a folder with the name acquired by the acquisition unit, and a storage unit configured to store the image data received by the receiving unit in a folder indicated by the folder path that is set by the setting unit.

Further features of the present invention will become apparent from the following description of exemplary embodiments with reference to the attached drawings.

BRIEF DESCRIPTION OF THE DRAWINGS

FIG. 3 is a diagram illustrating a hardware configuration of a file server according to an exemplary embodiment of the present invention.

FIG. 4 is a diagram illustrating a software configuration of the MFP according to an exemplary embodiment of the present invention.

FIG. 11 is a diagram illustrating a transfer setting according to an exemplary embodiment of the present invention.

FIG. 12 is a diagram illustrating an address book according to an exemplary embodiment of the present invention.

DESCRIPTION OF THE EMBODIMENTS

Various exemplary embodiments, features, and aspects of the invention will be described in detail below with reference to the drawings. Further, the embodiments described hereinafter are not intended to limit the content of the invention as described in the appended claims, and not all of the combinations of features described in the exemplary embodiments are required as the solutions of the present invention.

Figure 1:
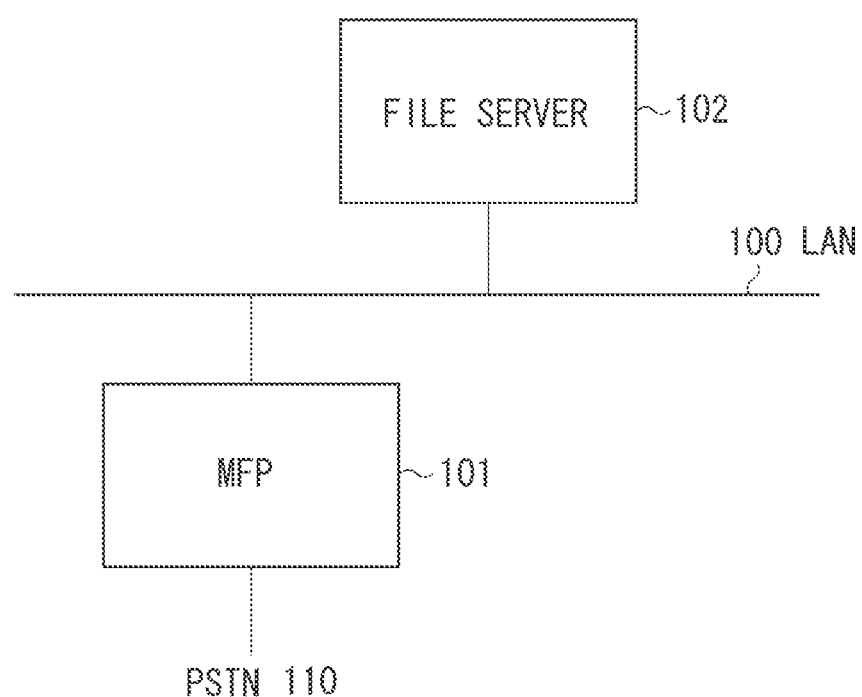
FIG. 1 is an overall view of an image processing system according to an exemplary embodiment of the present invention.

First, a first exemplary embodiment of the present invention will be described. FIG. 1 is an overall view of an image processing system. A multifunction peripheral (MFP) 101 and a file server 102 are communicably connected to each other on a local area network (LAN) 100. The MFP 101 is an example of an image processing apparatus. The file server 102 is an example of an external server. In the present exemplary embodiment, the MFP 101 and the file server 102 form an entire image processing system. However, only the MFP 101 may also be referred to as an image processing system.

The MFP 101 is connected to public switched telephone networks (PSTN) 110 so that image data can be transmitted and received to/from a facsimile apparatus (not illustrated) by facsimile communication.

Figure 2:
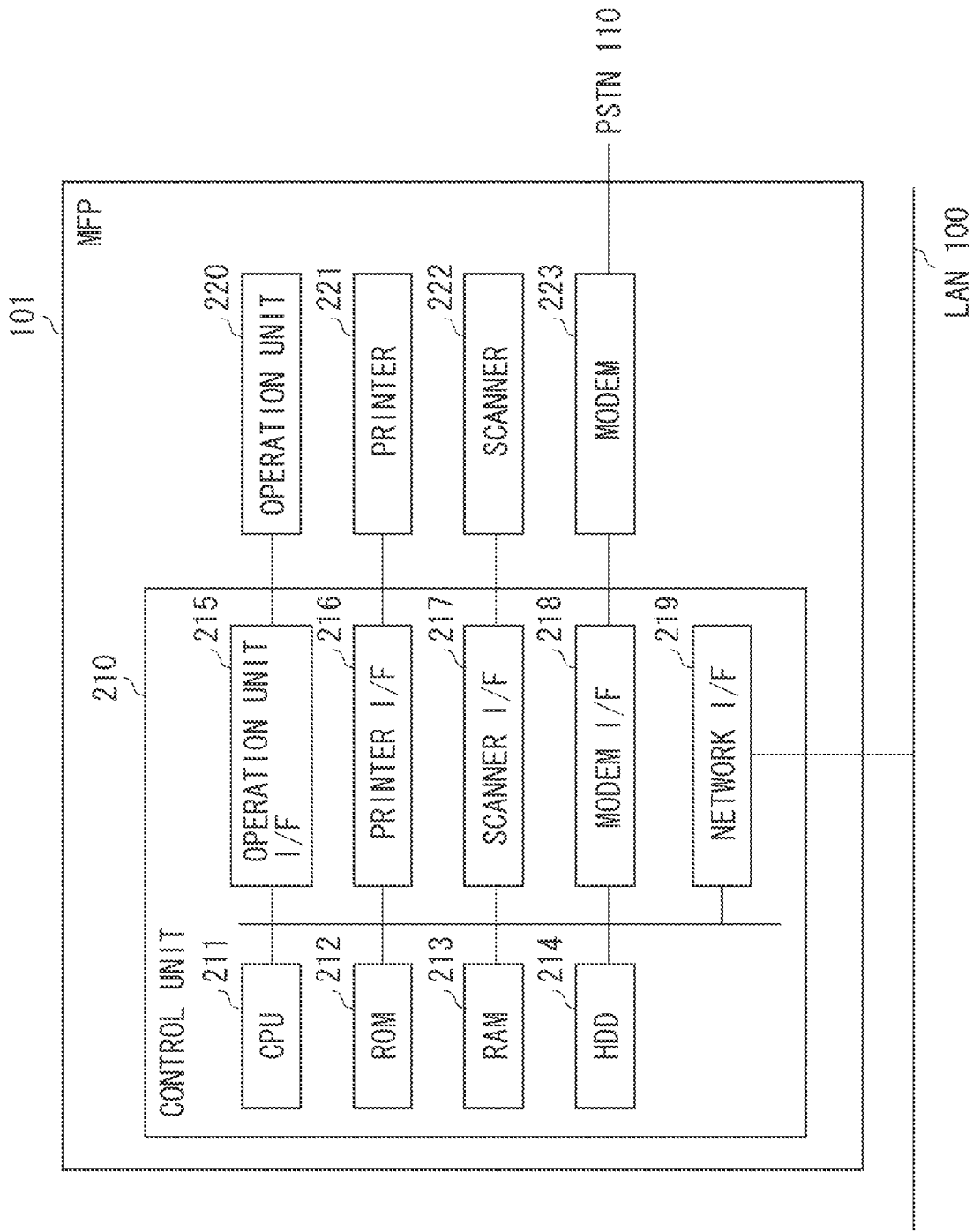
FIG. 2 is a diagram illustrating a hardware configuration of a multifunction peripheral (MFP) according to an exemplary embodiment of the present invention.

FIG. 2 is a diagram illustrating a hardware configuration of the MFP 101. A control unit 210 which includes a central processing unit (CPU) 211 controls the entire operation of the MFP 101. The CPU 211 performs various kinds of control on reading, printing, and communication by reading a control program stored in a read only memory (ROM) 212. A random access memory (RAM) 213 serves as a temporary storage area such as a main memory or a work area of the CPU 211. Although the MFP 101 causes a single CPU 211 to execute each processing illustrated in the flowcharts to be described below by using a single memory such as the RAM 213 or a hard disk drive (HDD) 214, other configurations may be also employed. For example, a plurality of CPUs may execute each processing illustrated in the flowcharts by working in cooperation with a plurality of RAMs or HDDs.

The HDD 214 stores image data and various programs. An operation unit interface (I/F) 215 connects an operation unit 220 to the control unit 210. The operation unit 220 includes a liquid crystal display unit having a touch-panel function and a keyboard and serves as a reception unit that receives an operation, an input, and an instruction from a user.

A printer I/F 216 connects a printer 221 to the control unit 210. Image data to be printed by the printer 221 is transferred from the control unit 210 via the printer I/F 216, so as to be printed on a recording medium by the printer 221.

A scanner I/F 217 connects a scanner 222 to the control unit 210. The scanner 222 generates image data by reading an image on a document and inputs the image data to the control unit 210 via the scanner I/F 217. The MFP 101 can transmit the image data generated by the scanner 222 by performing file transmission or mail transmission.

A modem I/F 218 connects a modem 223 to the control unit 210. The modem 223 executes facsimile communication of the image data with a facsimile apparatus (not illustrated). A network I/F 219 connects the control unit 210 (MFP 101) to the LAN 100. The MFP 101 transmits image data and information to an external apparatus on the LAN 100 (such as the file server 102), and receives various types of information by using the network I/F 219.

FIG. 3 is a diagram illustrating a hardware configuration of the file server 102. A control unit 310 which includes a CPU 311 controls the entire operation of the file server 102. The CPU 311 executes various kinds of control by reading a control program stored in a ROM 312. A RAM 313 serves as a temporary storage area such as a main memory or a work area of the CPU 311. The HDD 314 stores the image data and various programs.

A network I/F 315 connects the control unit 310 (the file server 102) to the LAN 100. The file server 102 transmits and receives various types of information to/from other apparatus on the LAN 100 by using the network I/F 315.

FIG. 4 is a diagram illustrating a software configuration of the MFP 101. The MFP 101 is mainly formed by two portions, a native function unit 410 and an additional application 420. Each of the units included in the native function unit 410 is a standard unit provided in the MFP 101, whereas the additional application 420 is an application additionally installed in the MFP 101. The additional application 420 is an application based on Java (registered trademark), allowing a function to be easily added to the MFP 101. Further, other additional application that is not illustrated in FIG. 4 may also be installed in the MFP 101.

A fax receiving unit 411 receives image data transmitted via the PSTN 110 by facsimile. The fax receiving unit 411 converts the received image data into a portable document format (PDF) and transfers the converted image data to a transfer unit 412. At this time, the fax receiving unit 411 creates a control file including information of the transmission source of the image data (i.e., the fax number of the transmission source) and received date and time of the image data, and transfers the control file together with the image data.

The transfer unit 412 transfers, according to the preset condition, the image data received from the fax receiving unit 411. Although a printing unit 413, the file server 102, or a personal computer (PC) (not illustrated) disposed on the LAN 100 may be specified as a transfer destination of the image data, in the present exemplary embodiment, all of the image data received by the fax receiving unit 411 is set to be temporarily transferred to the additional application 420.

The transfer unit 412 has a file transfer protocol (FTP) client function and transfers the image data to an application reception unit 422 having an FTP server function by FTP. In addition, the control file created by the fax receiving unit 411 is also transferred to the application reception unit 422 by FTP together with the image data. An address book memory unit 414 stores address information registered by the user of the MFP 101. The address book will be described below in detail with reference to FIG. 12.

The application reception unit 422 receives the image data internally transferred from the transfer unit 412 and transfers the received image data to an application transfer unit 421. The application transfer unit 421 transfers (transmits) the image data to the file server 102 according to the setting performed using a method to be described below. For the above-described transfer, in addition to FTP, a server message block (SMB) or a Web distributed authoring and versioning protocol for the WWW (WebDAV) can be used. Further, the application transfer unit 421 is allowed to access the address book memory unit 414 to acquire a registration name to be described below.

Figure 5A:
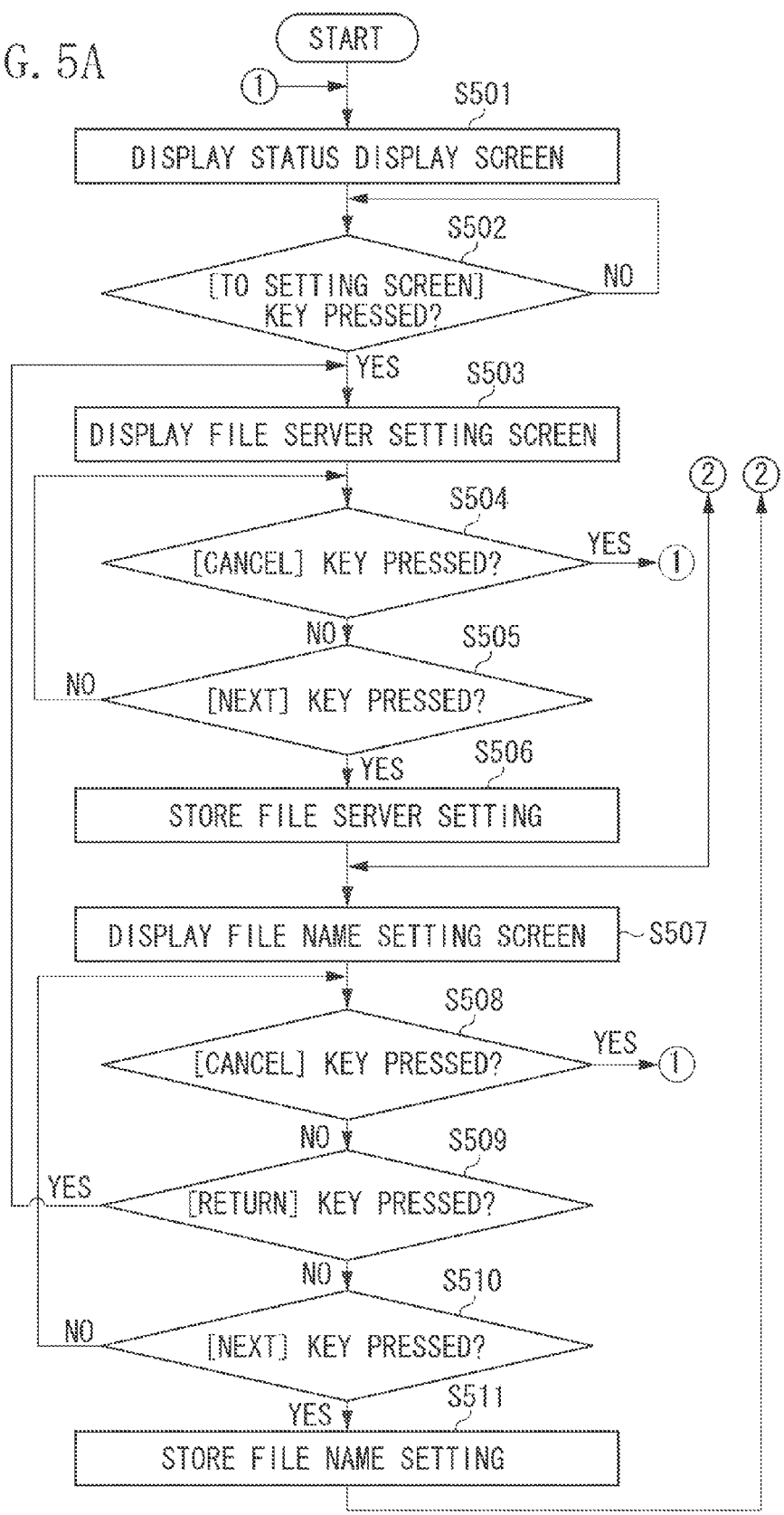
FIG. 5, which includes 5A and 5B, is a flowchart illustrating an operation of the MFP according to an exemplary embodiment of the present invention.

FIG. 5, which includes 5A and 5B, is a flowchart illustrating a setting operation performed by the MFP 101 for transferring the image data received by facsimile to the file server 102. The CPU 211 of the MFP 101 executes a control program stored in the HDD 214 to realize each operation (step) illustrated in the flowchart of FIG. 5.

Figure 6:
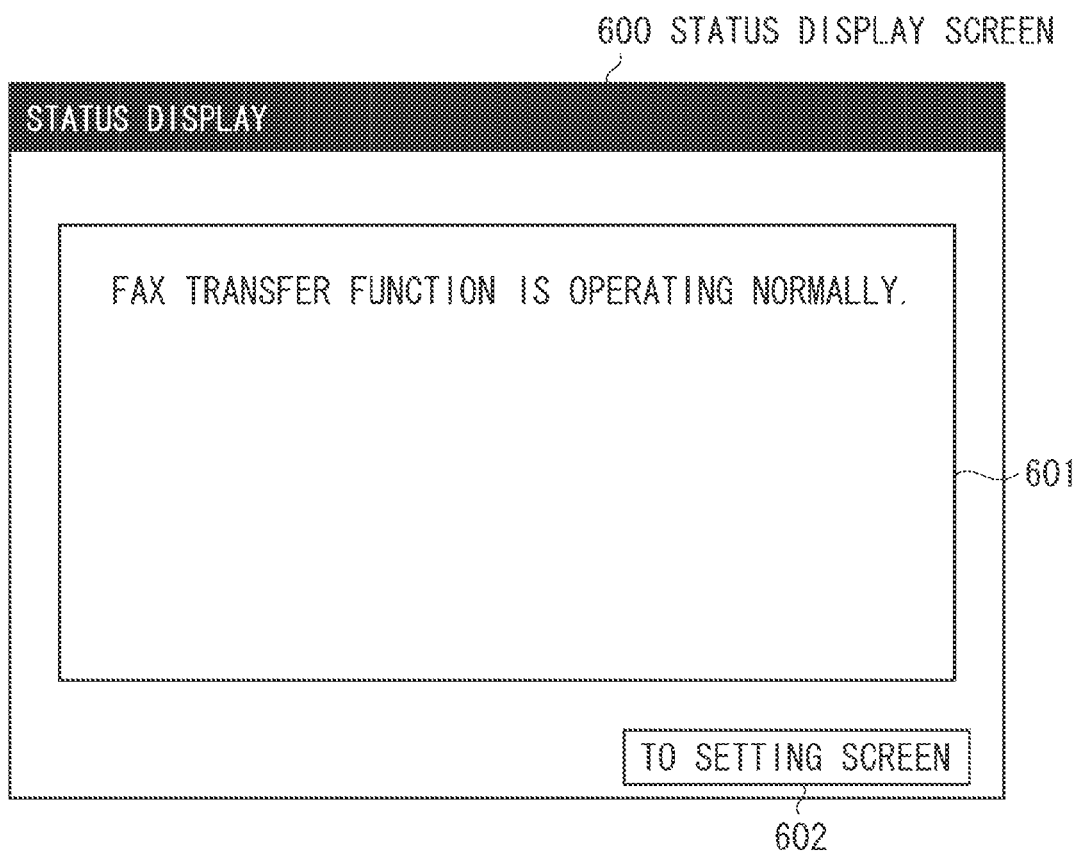
FIG. 6 is a diagram illustrating an operation screen of the MFP according to an exemplary embodiment of the present invention.

In step S501, the CPU 211 displays a status display screen 600 (see FIG. 6) on the operation unit 220. A message indicating the operation status of a current fax transfer function (the additional application 420) is displayed on a status display area 601 of the status display screen 600. The example of FIG. 6 illustrates a state where the additional application 420 is operating normally. For example, in a case where transfer of image data to the file server 102 has failed or the additional application 420 is not operating normally, a message indicating such a status is displayed on the status display area 601. In addition, an operation key for updating the display content of the status display area 601 may be provided on the status display screen 600.

In step S502, the CPU 211 determines whether a [TO SETTING SCREEN] key 602 of the status display screen 600 has been pressed. In step S502, the CPU 211 waits until the [TO SETTING SCREEN] key 602 is pressed. If the CPU 211 determines that the [TO SETTING SCREEN] key 602 has been pressed (YES in step S502), the processing proceeds to step S503. In the present exemplary embodiment, the only one key ([TO SETTING SCREEN] key 602) is displayed on the status display screen 600. However, separate keys may be also provided for shifting the status display screen 600 directly to below-described respective display screens (see FIGS. 7 through 10) thereon.

In step S503, the CPU 211 displays a file server setting screen 700 (see FIG. 7) on the operation unit 220. At this time, if the setting that has been stored in step S506 (to be described below) exists, the CPU 211 displays the file server setting screen 700 on which the setting is previously set. The user of the MFP 101 inputs the information for identifying the file server 102 and the information for accessing the file server 102 via the file server setting screen 700.

Specifically, in a host name 701, the user inputs the host name of the file server 102. In a folder path 702, the user inputs a starting point of the folder path for identifying a storage destination of the image data. In a user name 703 and a password 704, the user inputs authentication information (user name and password) necessary to log in the file server 102.

In step S504, the CPU 211 determines whether a [CANCEL] key 711 has been pressed. If the CPU 211 determines that the [CANCEL] key 711 has been pressed (YES in step S504), the processing returns to step S501, so that the CPU 211 displays the status display screen 600. If the CPU 211 determines that the [CANCEL] key 711 has not been pressed (NO in step S504), the processing proceeds to step S505. In step S505, the CPU 211 determines whether a [NEXT] key 712 has been pressed. If the CPU 211 determines that the [NEXT] key 712 has been pressed (YES in step S505), the processing proceeds to step S506. If the CPU 211 determines that the [NEXT] key 712 has not been pressed (NO in step S505), the processing returns to step S504.

In step S506, the CPU 211 stores in the HDD 214 the file server settings input to the host name 701, the folder path 702, the user name 703, and the password 704 on the file server setting screen 700. Subsequently, in step S507, the CPU 211 displays a file name setting screen 800 (see FIG. 8) on the operation unit 220. At this time, if the setting that has been stored in step S511 (described below) exists, the CPU 211 displays the file name setting screen 800 on which the setting is previously set. The user of the MFP 101 specifies via the file name setting screen 800 a rule for setting a file name to the image data to be transferred to the file server 102.

For the image data to be transferred to the file server 102 from the additional application 420, the user can set a file name by combining three types of information such as [REGISTRATION NAME], [FAX NO.], and [DATE & TIME]. [REGISTRATION NAME] is a name previously registered in the address book in association with the fax number of the transmission source of the image data. [FAX NO.] is a fax number of the transmission source of the image data. [DATE & TIME] is received date and time of the image data.

Figure 8:
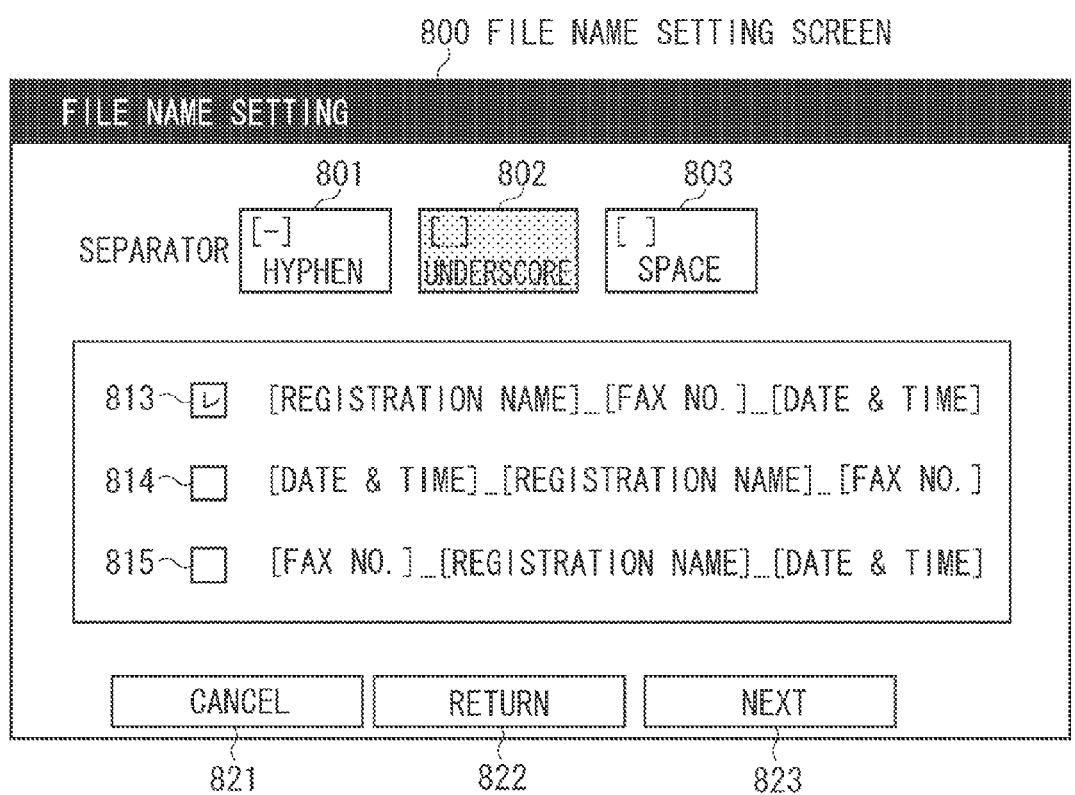
FIG. 8 is a diagram illustrating an operation screen of the MFP according to an exemplary embodiment of the present invention.

The user of the MFP 101 can select a separator (delimiter) for separating the above three types of information by using operation keys 801 through 803. A hyphen [-] can be selected by pressing the operation key 801. An underscore [_] can be selected by pressing the operation key 802. A space [ ] can be selected by pressing the operation key 803. In the example of FIG. 8, the underscore [_] is selected.

Further, the user of the MFP 101 can specify the arrangement order of the above three types of information by using check boxes 813 through 815. If the user checks the check box 813, a file name in which the three types of information are combined and arranged in the order of [REGISTRATION NAME], [FAX NO.], and [DATE & TIME] is set. For example, if the registration name, the fax number, and the date and time are "ABC Corporation", "0311112222", and "Jan. 1, 2013, 12:15:10" respectively, a file name [ABC Corporation_0311112222_20130101121510.pdf] will be set.

If the user checks the check box 814, a file name in which the three types of information are combined and arranged in the order of [DATE & TIME], [REGISTRATION NAME], and [FAX NO.] is set. If the user checks the check box 815, a file name in which the three types of information are combined and arranged in the order of [FAX NO.], [REGISTRATION NAME], and [DATE & TIME] is set. In the present exemplary embodiment, not all kinds of the arrangement order are displayed as the candidates (only some kinds of the arrangement order are displayed as the candidates). However, all kinds of the alignment order may be displayed as the candidates.

In step S508, the CPU 211 determines whether a [CANCEL] key 821 has been pressed. If the CPU 211 determines that the [CANCEL] key 821 has been pressed (YES in step S508), the processing returns to step S501, so that the CPU 211 displays the status display screen 600. If the CPU 211 determines that the [CANCEL] key 821 has not been pressed (NO in step S508), the processing proceeds to step S509. In step S509, the CPU 211 determines whether a [RETURN] key 822 has been pressed. If the CPU 211 determines that the [RETURN] key 822 has been pressed (YES in step S509), the processing returns to step S503, so that the CPU 211 displays the file server setting screen 700. If the CPU 211 determines that the [RETURN] key 822 has not been pressed (NO in step S509), the processing proceeds to step S510. In step S510, the CPU 211 determines whether a [NEXT] key 823 has been pressed. If the CPU 211 determines that the [NEXT] key 823 has been pressed (YES in step S510), the processing proceeds to step S511. If the CPU 211 determines that the [NEXT] key 823 has not been pressed (NO in step S510), the processing returns to step S508.

In step S511, the CPU 211 stores in the HDD 214 the information specified via the file name setting screen 800. Subsequently, in step S512, the CPU 211 displays a folder path setting screen 900 (see FIG. 9) on the operation unit 220. At this time, if the setting that has been stored in step S516 (to be described below) exists, the CPU 211 displays the folder path setting screen 900 on which the setting is previously set. The user of the MFP 101 specifies via the folder path setting screen 900 a rule for setting a folder path for identifying a folder that serves as a storage destination of the image data.

If the user checks a check box 901, the image data is stored in a folder specified by selection columns 911 through 913. If the user does not check the check box 901, the image data is stored in an area indicated by the folder path 702 of the file server setting screen 700.

In the selection column 911, the type of information to be used as a folder name of the first hierarchy (uppermost hierarchy of three hierarchies) is specified. The user of the MFP 101 selects the type of information from candidates such as [REGISTRATION NAME], [FAX NO.], and [DATE] provided in a pull-down menu. [REGISTRATION NAME] is a name previously registered in the address book in association with the fax number of the transmission source of the image data. [FAX NO.] is a fax number of the transmission source of the image data. [DATE] is a received date of the image data. In addition, it is possible for the user not to select any of the above information types. In such a case, the image data is stored in an area specified by the folder path 702 of the file server setting screen 700.

In the selection column 912, the type of information to be used as a folder name of the second hierarchy (intermediary hierarchy of three hierarchies) is specified. In a similar manner to the first hierarchy, the user of the MFP 101 selects the type of information from candidates such as [REGISTRATION NAME], [FAX NO.], and [DATE] provided in a pull-down menu. In addition, it is possible for the user not to select any of the above information types. In such a case, the image data is stored in a folder specified in the selection column 911.

In the selection column 913, the type of information to be used as a folder name of the third hierarchy (lowermost hierarchy of three hierarchies) is specified. In a similar manner to the first hierarchy, the user of the MFP 101 selects the type of information from candidates such as [REGISTRATION NAME], [FAX NO.], and [DATE] provided in a pull-down menu. In addition, it is possible for the user not to select any of the above information types. In such a case, the image data is stored in a folder specified in the selection column 912.

In a display column 914, arrangement order of the various types of information is displayed according to the options selected for the respective hierarchies in the selection columns 911 through 913. In the example illustrated in FIG. 9, the folder name of the first hierarchy is [REGISTRATION NAME], the folder name of the second hierarchy is [FAX NO.], and the folder name of the third hierarchy is [DATE]. The folder path displayed in the display column 914 is added to the end of the character string specified by the folder path 702 of the file server setting screen 700, so that an official folder path is completed. For example, in a case where the registration name, the fax number, and the date are "ABC Corporation", "0311112222", and "Jan. 1, 2013", respectively, a folder path [root/ABC Corporation/0311112222/20130101] will be set.

In step S513, the CPU 211 determines whether a [CANCEL] key 921 has been pressed. If the CPU 211 determines that the [CANCEL] key 921 has been pressed (YES in step S513), the processing returns to step S501, so that the CPU 211 displays the status display screen 600. If the CPU 211 determines that the [CANCEL] key 921 has not been pressed (NO in step S513), the processing proceeds to step S514. In step S514, the CPU 211 determines whether a [RETURN] key 922 has been pressed. If the CPU 211 determines that the [RETURN] key 922 has been pressed (YES in step S514), the processing returns to step S507, so that the CPU 211 displays the file name setting screen 800. If the CPU 211 determines that the [RETURN] key 922 has not been pressed (NO in step S514), the processing proceeds to step S515. In step S515, the CPU 211 determines whether a [NEXT] key 923 has been pressed. If the CPU 211 determines that the [NEXT] key 923 has been pressed (YES in step S515), the processing proceeds to step S516. If the CPU 211 determines that the [NEXT] key 923 has not been pressed (NO in step S515), the processing returns to step S513.

In step S516, the CPU 211 stores in the HDD 214 the information specified via the folder path setting screen 900. Subsequently, in step S517, the CPU 211 displays a transmission test screen 1000 (see FIG. 10) on the operation unit 220. The user of the MFP 101 can perform a transmission test for the file server 102 via the transmission test screen 1000.

An arbitrary transmission source fax number to be used for the transmission test is input to a fax number 1001. Further, arbitrary received date and time to be used for the transmission test is input to a received date and time 1002. Further, although a description is omitted in the flowchart of FIG. 5, when the user presses a [CONFIRM SETTING] key 1011, information about the file name of the image data and the folder in which the image data is to be stored is displayed based on the information set in the fax number 1001 and the received date and time 1002, and the settings performed on the respective screens illustrated in FIGS. 7 through 9. With this configuration, the user can check the details of the settings.

In step S518, the CPU 211 determines whether a [TRANSMISSION TEST] key 1012 has been pressed. If the CPU 211 determines that the [TRANSMISSION TEST] key 1012 has been pressed (YES in step S518), the processing proceeds to step S519. If the CPU 211 determines that the [TRANSMISSION TEST] key 1012 has not been pressed (NO in step S518), the processing proceeds to step S520.

Figure 7:
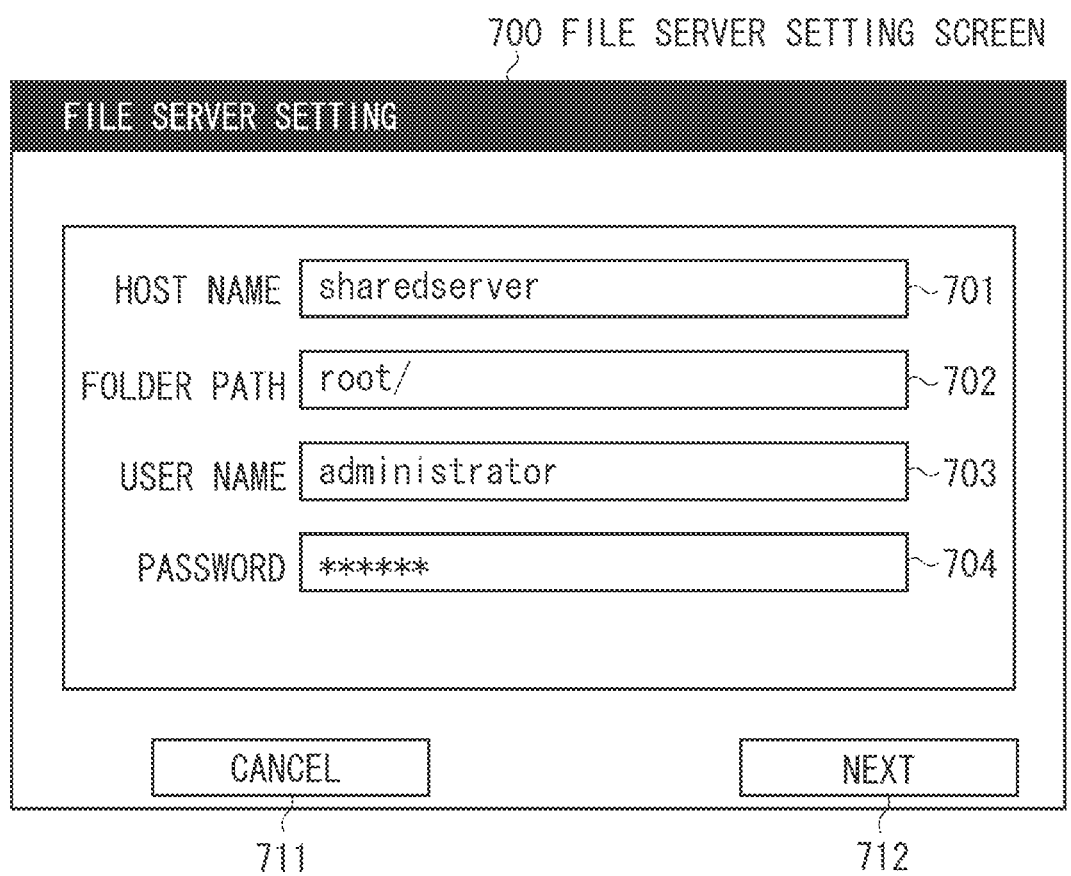
FIG. 7 is a diagram illustrating an operation screen of the MFP according to an exemplary embodiment of the present invention.
Figure 9:
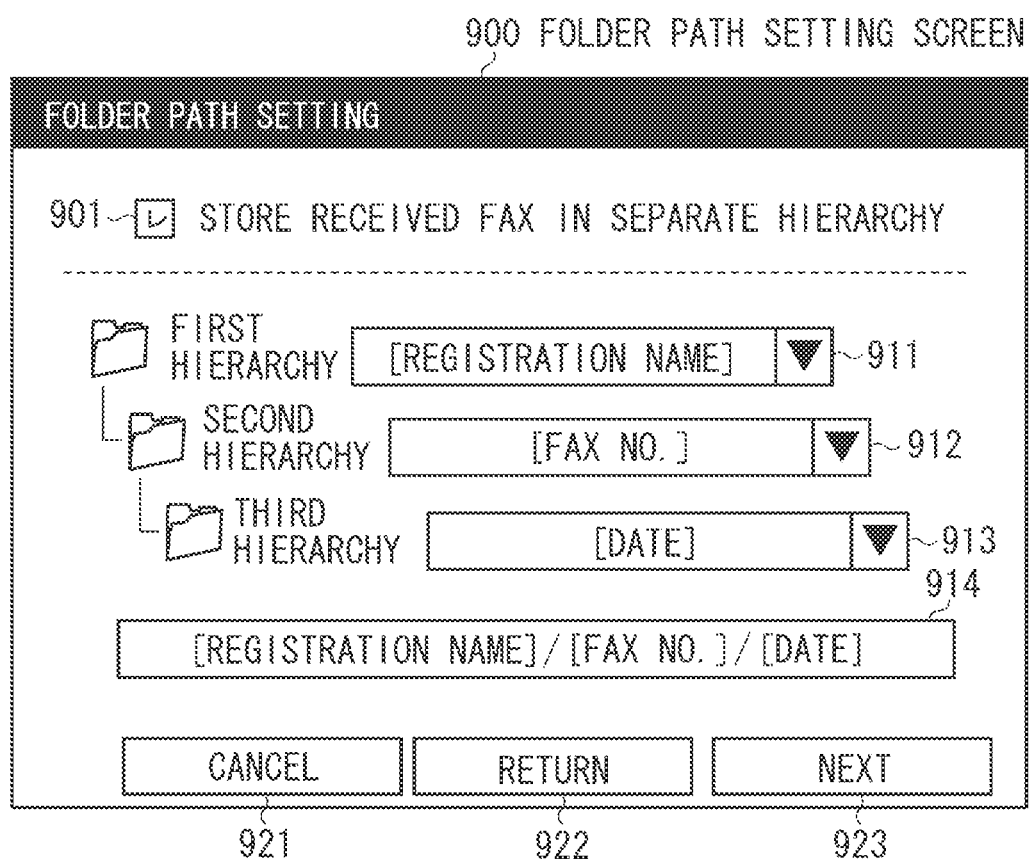
FIG. 9 is a diagram illustrating an operation screen of the MFP according to an exemplary embodiment of the present invention.
Figure 10:
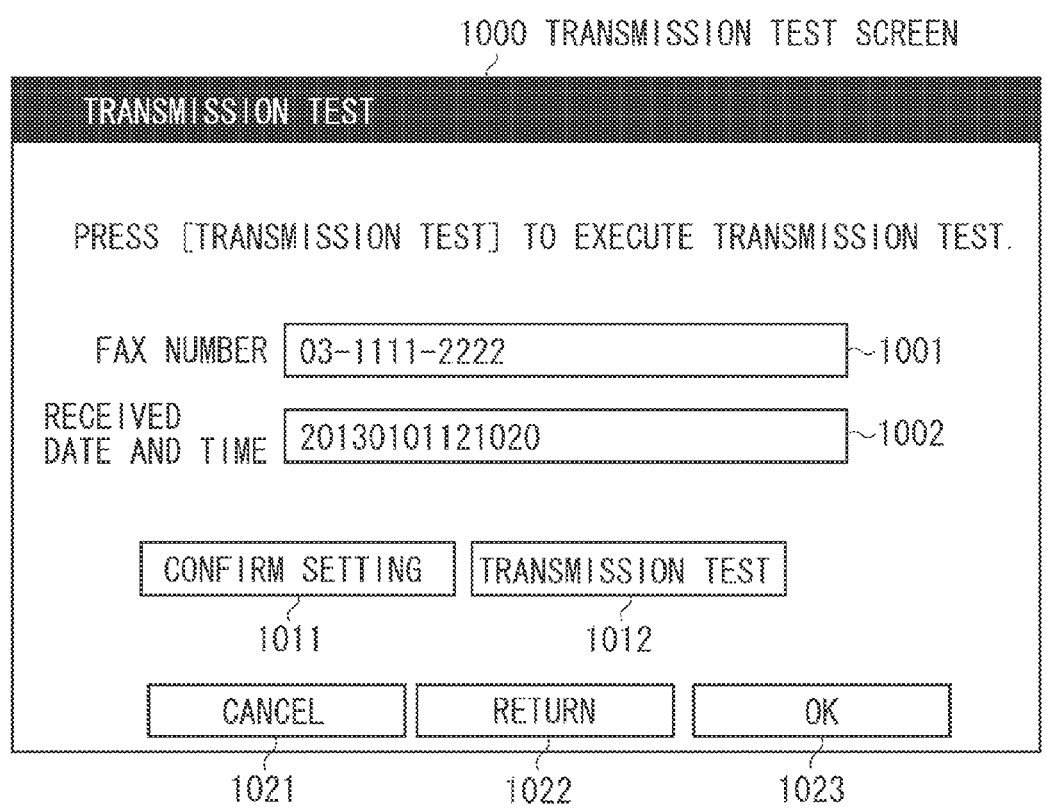
FIG. 10 is a diagram illustrating an operation screen of the MFP according to an exemplary embodiment of the present invention.

In step S519, the CPU 211 executes the transmission test based on the information set in the fax number 1001 and the received date and time 1002, and the settings performed on the respective screens of FIGS. 7 through 9. In the transmission test, test image data previously stored in the additional application 420 (in the HDD 214) is actually transmitted to the file server 102. By executing the transmission test, the user can check whether the image data is normally stored in a folder within the file server 102. Further, a screen indicating a result of the transmission test may be displayed after executing the transmission test.

In step S520, the CPU 211 determines whether a [CANCEL] key 1021 has been pressed. If the CPU 211 determines that the [CANCEL] key 1021 has been pressed (YES in step S520), the processing returns to step S501, so that the CPU 211 displays the status display screen 600. If the CPU 211 determines that the [CANCEL] key 1021 has not been pressed (NO in step S520), the processing proceeds to step S521. In step S521, the CPU 211 determines whether a [RETURN] key 1022 has been pressed. If the CPU 211 determines that the [RETURN] key 1022 has been pressed (YES in step S521), the processing returns to step S512, so that the CPU 211 displays the folder path setting screen 900. If the CPU 211 determines that the [RETURN] key 1022 has not been pressed (NO in step S521), the processing proceeds to step S522. In step S522, the CPU 211 determines whether an [OK] key 1023 has been pressed. If the CPU 211 determines that the [OK] key 1023 has been pressed (YES in step S522), the CPU 211 ends the processing. If the CPU 211 determines that the [OK] key 1023 has not been pressed (NO in step S522), the processing returns to step S518.

FIG. 11 is a diagram illustrating a transfer setting 1100 that is set according to the flowchart of FIG. 5. The transfer setting 1100 is stored in the HDD 214 in a comma separated value (CSV) format or an extensible markup language (XML) format. However, other format may be used therefor.

A row 1101 describes the host name of the file server 102 input to the host name 701 of the file server setting screen 700. A row 1102 describes the starting point of the folder path input to the folder path 702 of the file server setting screen 700. A row 1103 describes the name of the user to log in the file server 102 which is input to the user name 703 of the file server setting screen 700. A row 1104 describes the password for logging in the file server 102 which is input to the password 704 of the file server setting screen 700.

A row 1105 describes the file name setting rule set on the file name setting screen 800. In the example of FIG. 11, the file name is set to be arranged in the order of [REGISTRATION NAME], [FAX NO.], and [DATE AND TIME] using the underscore [_] as a separator. A row 1106 describes the folder path setting rule set on the folder path setting screen 900. In the example of FIG. 11, the folder path is set to be arranged in the order of [REGISTRATION NAME], [FAX NO.], and [DATE].

FIG. 12 is a diagram illustrating the content of an address book 1200 stored in the address book memory unit 414. A destination address identification (ID) 1201 is an ID which uniquely indicates each destination address registered in the address book 1200. A name 1202 is a name of each destination address registered in the address book 1200. A fax number 1203 is a fax number of each destination address registered in the address book 1200.

In a case where the image data read by the scanner 222 is transmitted from the MFP 101 via the PSTN 110 by facsimile, referring to the address book 1200 can save the user from having to specify the destination address. In addition to the destination address of facsimile transmission, a destination address of e-mail transmission and a destination address of file transmission (FTP, SMB, and WebDAV) may be registered in the address book 1200.

Figure 13:
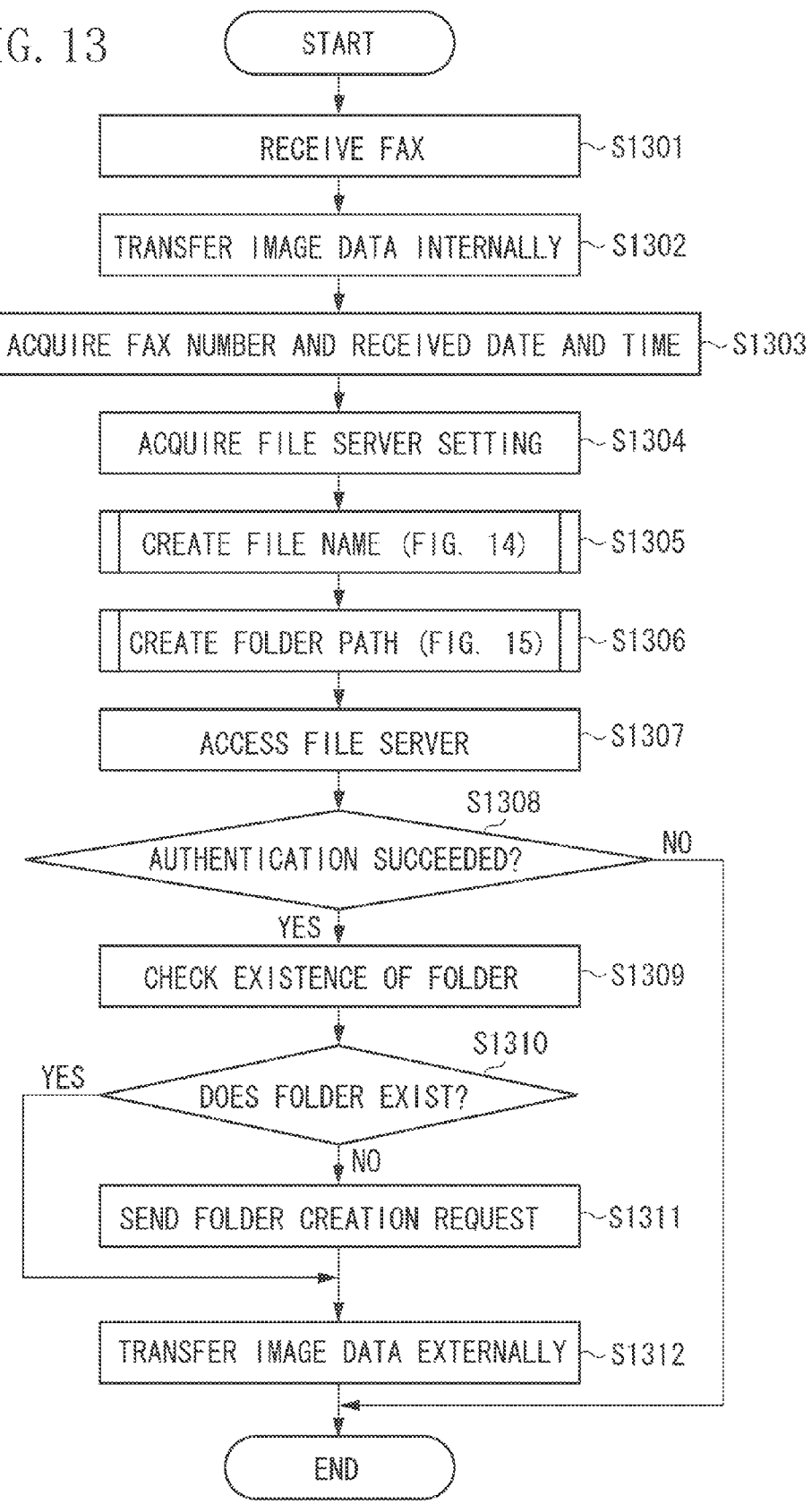
FIG. 13 is a flowchart illustrating an operation of the MFP according to an exemplary embodiment of the present invention.
Figure 14:
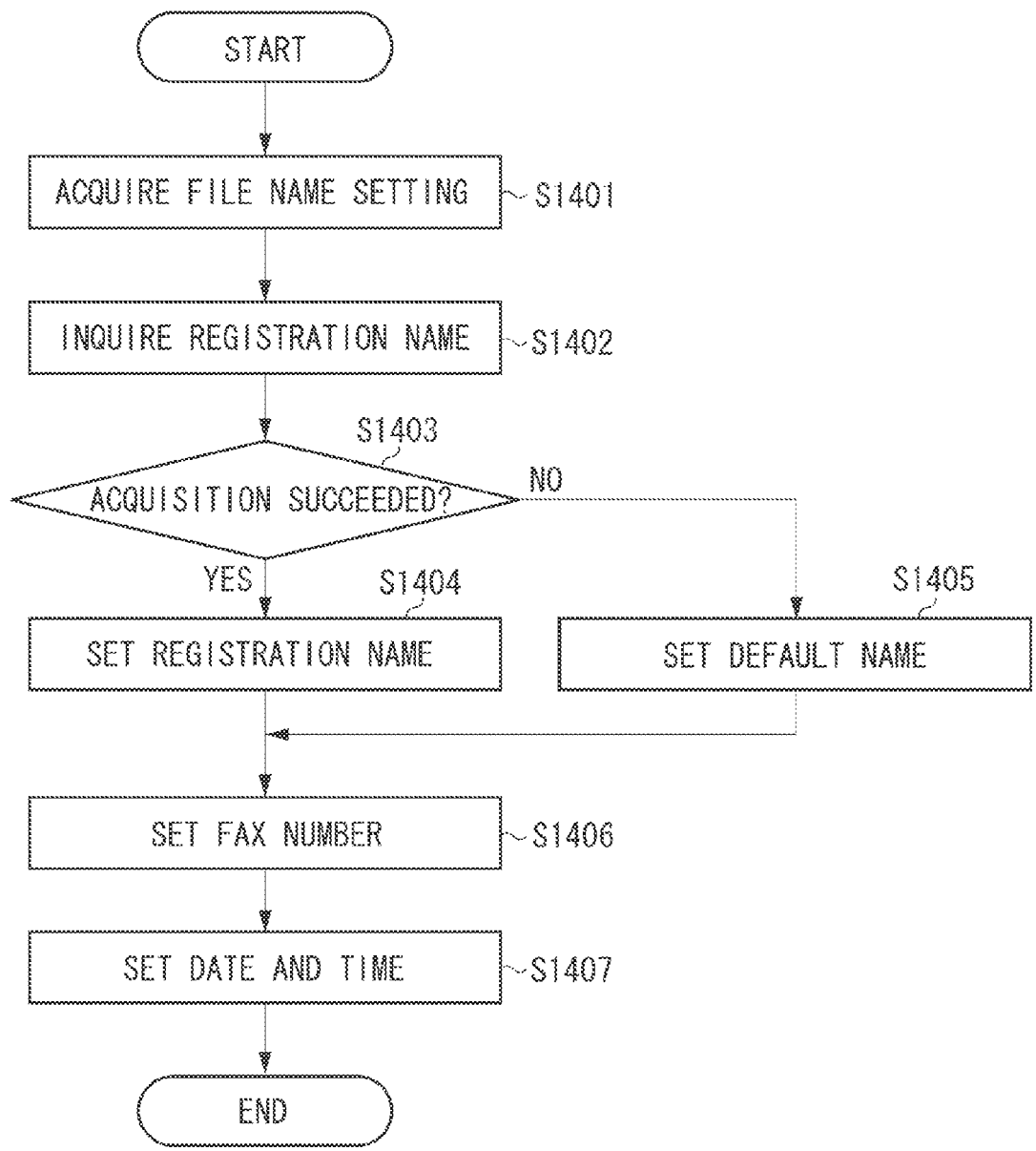
FIG. 14 is a flowchart illustrating an operation of the MFP according to an exemplary embodiment of the present invention.
Figure 15:
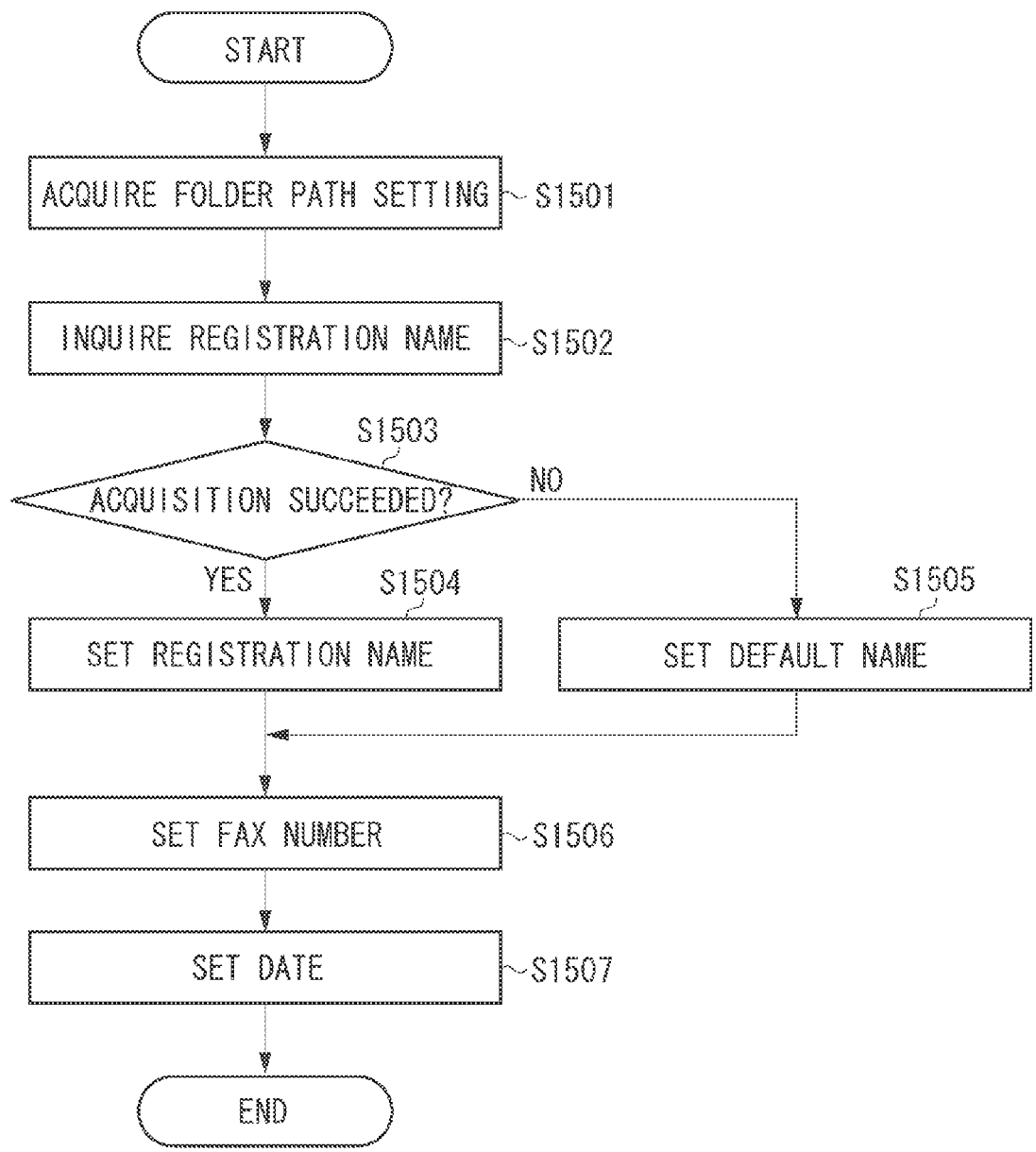
FIG. 15 is a flowchart illustrating an operation of the MFP according to an exemplary embodiment of the present invention.

FIGS. 13 through 15 are flowcharts illustrating operations performed by the MFP 101 to transfer the image data received by facsimile to the file server 102. The CPU 211 of the MFP 101 executes a control program stored in the HDD 214 to realize each operation (step) illustrated in the flowchart of FIGS. 13 through 15.

In step S1301, the fax receiving unit 411 receives the image data by facsimile. In step S1302, the transfer unit 412 internally transfers the image data to the application reception unit 422 by FTP. In step S1303, the application transfer unit 421 acquires a fax number of the transmission source and received date and time of the image data from a control file transferred together with the image data.

In step S1304, the application transfer unit 421 acquires the file server setting included in the transfer setting 1100. In step 1305, the application transfer unit 421 creates a file name that is to be set to the image data. In step S1306, the application transfer unit 421 creates a folder path for identifying a storage destination of the image data.

In step S1307, the application transfer unit 421 accesses the file server 102. At this time, the application transfer unit 421 transmits to the file server 102 a user name and a password which are included in the file server setting acquired in step S1304, and receives a result of authentication executed by the file server 102. In step S1308, the application transfer unit 421 determines whether the authentication has succeeded (i.e., whether the application transfer unit 421 has been able to log into the file server 102). If the authentication has succeeded (YES in step S1308), the processing proceeds to step S1309. If the authentication has failed (NO in step S1308), the application transfer unit 421 ends the processing.

In step S1309, the application transfer unit 421 checks (i.e., makes an inquiry of the file server 102 about) the existence of the folder indicated by the folder path created in step S1306. In step S1310, the application transfer unit 421 determines whether the corresponding folder exists therein. If the corresponding folder exists (YES in step S1310), the processing proceeds to step S1312. If the corresponding folder does not exist (NO in step S1310), the processing proceeds to step S1311.

In step S1311, the application transfer unit 421 issues a request to the file server 102 for creating the folder indicated by the folder path created in step S1306. In step S1312, the application transfer unit 421 externally transfers the image data to the file server 102 to store the image data in the folder specified by the folder path created in step S1306.

FIG. 14 is a flowchart illustrating the processing of step S1305 in FIG. 13 in detail. In step S1401, the application transfer unit 421 acquires a file name setting included in the transfer setting 1100. In step S1402, the application transfer unit 421 makes an inquiry of the address book memory unit 414 about a name that is registered in association with the fax number of the transmission source.

In step S1403, the application transfer unit 421 determines whether acquisition of the registration name from the address book memory unit 414 has succeeded. If the application transfer unit 421 determines that the acquisition of the registration name has succeeded (YES in step S1403), the processing proceeds to step S1404. In step S1404, the application transfer unit 421 sets the acquired registration name as a part of the file name. If the application transfer unit 421 determines that the acquisition of the registration name has failed (NO in step S1403), for example, if the fax number of the transmission source is not registered in the address book 1200, the processing proceeds to step S1405. In step S1405, the application transfer unit 421 sets a default name as a part of the file name. The default name is a string of letters such as "not available", for example.

In step S1406, the application transfer unit 421 sets the fax number acquired in step S1303 as a part of the file name. In step S1407, the application transfer unit 421 sets the received date and time acquired in step S1303 as a part of the file name. In addition, the settings executed in steps S1404 through S1407 will be executed according to the content of the file name setting acquired in step S1401.

FIG. 15 is a flowchart illustrating the processing of step S1306 in FIG. 13 in detail. In step S1501, the application transfer unit 421 acquires the folder path setting included in the transfer setting 1100. In step S1502, the application transfer unit 421 makes an inquiry of the address book memory unit 414 about a name that is registered in association with the fax number of the transmission source. In a case where the registration name has already been acquired in step S1402 of FIG. 14, the processing of step S1502 may be omitted.

In step S1503, the application transfer unit 421 determines whether acquisition of the registration name from the address book memory unit 414 has succeeded. If the application transfer unit 421 determines that the acquisition of the registration name has succeeded (YES in step S1503), the processing proceeds to step S1504. In step S1504, the application transfer unit 421 sets the acquired registration name as a part of the folder path. If the application transfer unit 421 determines that the acquisition of the registration name has failed (NO in step S1503), for example, if the fax number of the transmission source is not registered in the address book 1200, the processing proceeds to step S1505. In step S1505, the application transfer unit 421 sets a default name as a part of the folder path. The default name is a string of letters such as "not available", for example.

In step S1506, the application transfer unit 421 sets the fax number acquired in step S1303 as a part of the folder path. In step S1507, the application transfer unit 421 sets the received date acquired in step S1303 as a part of the folder path. In addition, the settings executed in steps S1504 through S1507 will be performed according to the content of the folder path setting acquired in step S1501.

As described above, according to the present exemplary embodiment, particularly, by providing the folder path setting screen illustrated in FIG. 9, the settings for sorting and storing the received image data in a plurality of folders can be executed easily.

Figure 16:
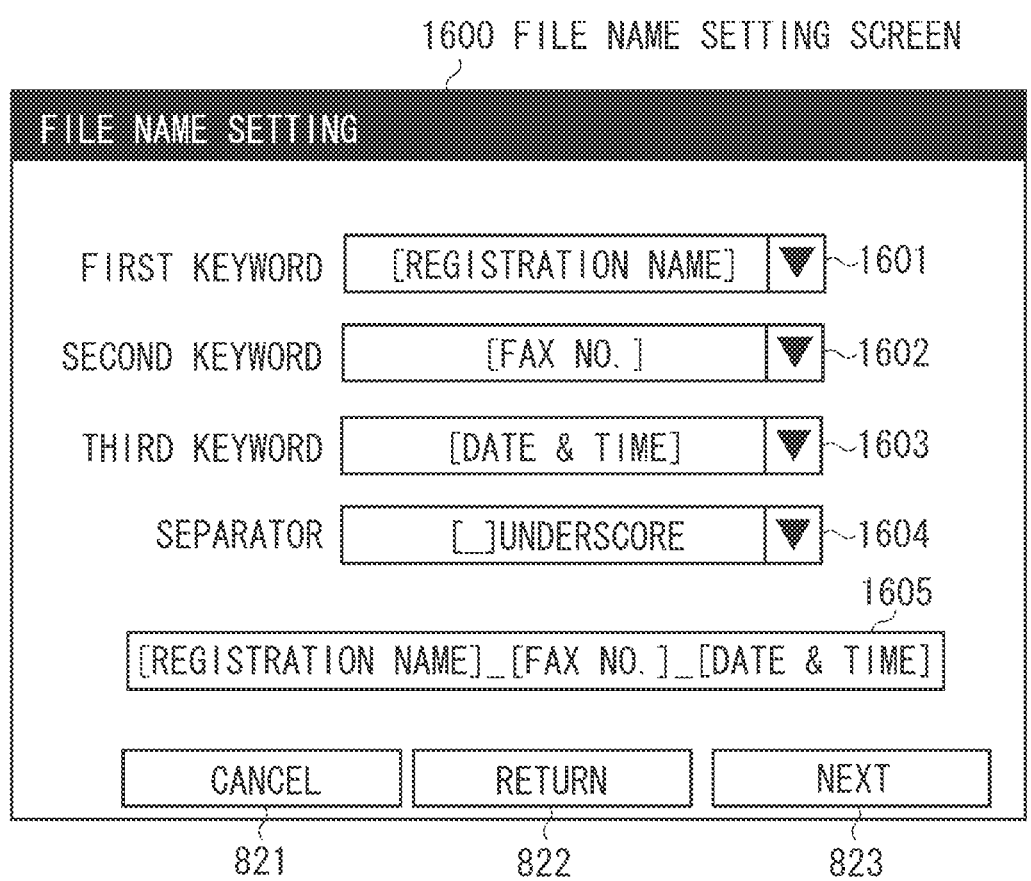
FIG. 16 is a diagram illustrating an operation screen of the MFP according to an exemplary embodiment of the present invention.
Figure 17:
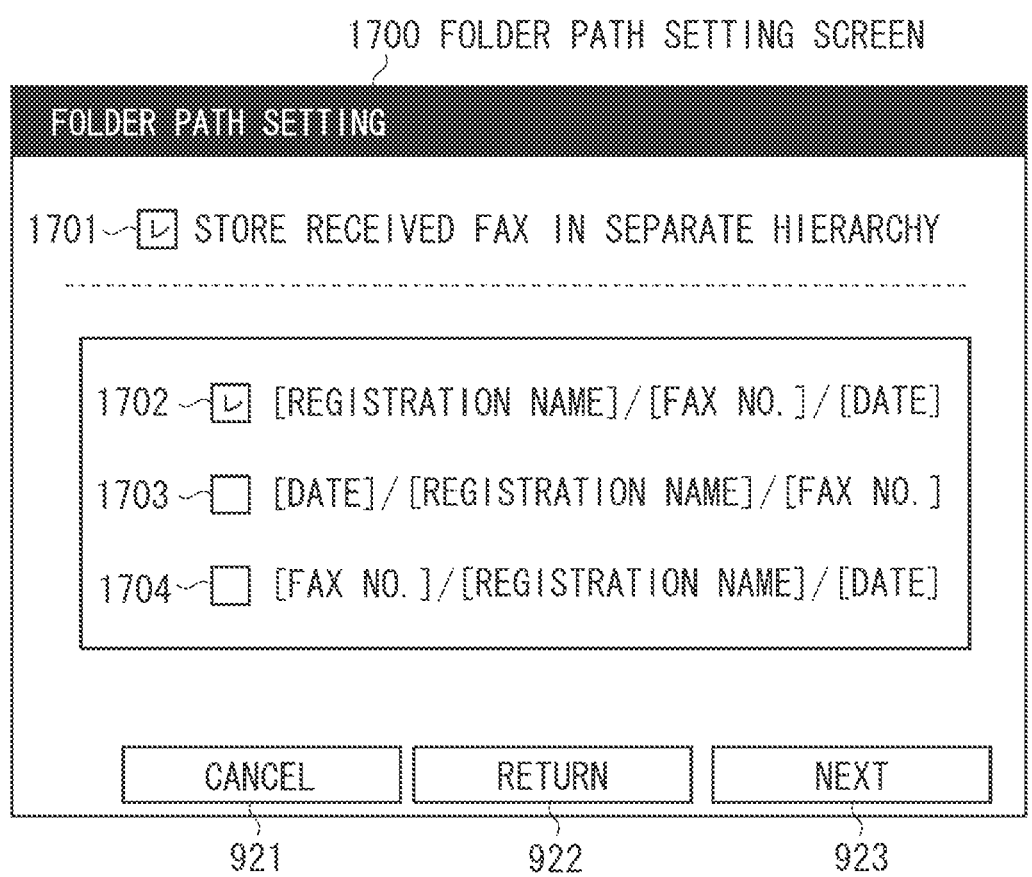
FIG. 17 is a diagram illustrating an operation screen of the MFP according to an exemplary embodiment of the present invention.

Next, a second exemplary embodiment of the present invention will be described. In the present exemplary embodiment, a file name setting screen 1600 illustrated in FIG. 16 is displayed instead of the file name setting screen 800 described in the first exemplary embodiment. In addition, a folder path setting screen 1700 illustrated in FIG. 17 is displayed instead of the folder path setting screen 900 described in the first exemplary embodiment. Further, the other configurations are similar to those described in the first exemplary embodiment, and thus the descriptions thereof will be omitted.

The user of the MFP 101 specifies, via the file name setting screen 1600 illustrated in FIG. 16, a rule for setting a file name to the image data to be transferred to the file server 102.

In a selection column 1601, the type of information to be used as a first keyword (keyword initially arranged from among three keywords) is specified. The user of the MFP 101 selects the type of information from candidates such as [REGISTRATION NAME], [FAX NO.], and [DATE & TIME] provided in a pull-down menu. [REGISTRATION NAME] is a name previously registered in the address book 1200 in association with the fax number of the transmission source of the image data. [FAX NO.] is a fax number of the transmission source of the image data. [DATE & TIME] is received date and time of the image data.

In a selection column 1602, the type of information to be used as a second keyword (keyword secondarily arranged from among the three keywords) is specified. In a similar manner to the first keyword, the user of the MFP 101 selects the type of information from candidates such as [REGISTRATION NAME], [FAX NO.], and [DATE & TIME] provided in a pull-down menu.

In a selection column 1603, the type of information to be used as a third keyword (keyword lastly arranged from among the three keywords) is specified. In a similar manner to the first keyword, the user of the MFP 101 selects the type of information from candidates such as [REGISTRATION NAME], [FAX NO.], and [DATE & TIME] provided in a pull-down menu.

In a selection column 1604, a separator (delimiter) for separating the above three types of information is specified. The user of the MFP 101 selects the type of separator from candidates such as a hyphen [-], an underscore [_], and a space [ ] provided in a pull-down menu.

In a display column 1605, arrangement order of the various types of information and a separator according to the selections executed in the selection columns 1601 through 1604 are displayed. In the example illustrated in FIG. 16, the first keyword is [REGISTRATION NAME], the second keyword is [FAX NO.], the third keyword is [DATE & TIME], and a separator is the underscore [_]. For example, in a case where the registration name, the fax number, and the date and time are "ABC Corporation", "0311112222", and "Jan. 1, 2013, 12:15:10", respectively, a file name [ABC Corporation_0311112222_20130101121510.pdf] will be set.

The user of the MFP 101 specifies, via the folder path setting screen 1700, a rule for setting a folder path for identifying a folder that serves as a storage destination of the image data.

If the user checks a check box 1701, the image data will be stored in a folder specified by any of check boxes 1702, 1703, and 1704. If the user does not check the check box 1701, the image data will be stored in an area specified in the folder path 702 of the file server setting screen 700.

A folder path for identifying a storage destination of the image data is set by combining three types of information such as [REGISTRATION NAME], [FAX NO.], and [DATE]. [REGISTRATION NAME] is a name previously registered in the address book 1200 in association with the fax number of the transmission source of the image data. [FAX NO.] is a fax number of the transmission source of the image data. [DATE] is a received date of the image data.

The user of the MFP 101 can specify the arrangement order of the above-described three types of information by using any of the check boxes 1702, 1703, and 1704. If the user checks the check box 1702, a folder path in which the three types of information are combined and arranged in the order of [REGISTRATION NAME], [FAX NO.], and [DATE] is set. For example, if the registration name, the fax number, and the date are "ABC Corporation", "0311112222", and "Jan. 1, 2013", respectively, a folder path [root/ABC Corporation/0311112222/20130101] will be set.

If the user checks the check box 1703, a folder path in which the three types of information are combined and arranged in the order of [DATE], [REGISTRATION NAME], and [FAX NO.] is set. If the user checks the check box 1704, a folder path in which the three types of information are combined and arranged in the order of [FAX NO.], [REGISTRATION NAME], and [DATE] is set. In the present exemplary embodiment, not all kinds of the arrangement order are displayed as the candidates (only some kinds of the arrangement order are displayed as the candidates). However, all kinds of the arrangement order may be displayed as the candidates.

As described in the first and the second exemplary embodiments, the image processing system according to the present exemplary embodiments acquires a name that is registered in the address book in association with the transmission source information (fax number) of the received image data. The image processing system is configured to then set a folder path by using the acquired name and store the received data in a folder specified by the set folder path.

Further, the image processing system according to the present exemplary embodiments is configured to set a folder path by using the information of the transmission source or the received date of the received image data to store the received image data in a folder indicated by the set folder path.

Furthermore, the image processing system according to the present exemplary embodiments is configured to receive a specification for the arrangement order of a plurality of types of information, set a folder path in which the plurality of types of information are combined according to the received specification, and store the received image data in a folder indicated by the set folder path.

With the above-described configurations, the settings for sorting and storing the received image data in a plurality of folders can be executed easily.

Further, in the above-described exemplary embodiments, the example of combining the three types of information, [REGISTRATION NAME], [FAX NO.], and [DATE] (or

[DATE & TIME]) has been described. However, other types of information may be used. In addition, two types or more than four types of information may be combined as well.

Furthermore, the image data to be transferred to the file server 102 is not limited to the image data received by facsimile, and image data received by e-mail or other communication protocols may be transferred thereto.

In addition, in the above-described exemplary embodiments, the image data is stored in a folder within a file server on the network (within the file server 102). However, the image data may be stored in a folder within the HDD 214 of the MFP 101.

The exemplary embodiments of the present invention can be achieved by executing the following processing. In other words, a storage medium storing a program code of software for implementing the functions of the above-described exemplary embodiments is supplied to a system or an apparatus, so that a computer (or a CPU or a micro processing unit (MPU)) of the system or the apparatus reads out the program code stored in the storage medium.

In this case, the program code itself read from the storage medium realizes the functions described in the above exemplary embodiments, and thus the program code and the storage medium storing the program code constitute the exemplary embodiments of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-065035 filed Mar. 26, 2013, which is hereby incorporated by reference herein in its entirety.

What is claimed is:

1. An image processing apparatus comprising:
   a memory configured to store an address book which registers a name and address in association with each other;
   at least one processor in communication with the memory, the at least one processor performs
   storing a rule for setting a folder path which includes a plurality of hierarchical folders, wherein the rule defines that a name registered in the address book is used as a folder name of one folder selected from the plurality of hierarchical folders, and wherein the rule is stored before receiving image data;
   receiving, from an external apparatus, image data and an address of the external apparatus;
   acquiring a name, that is registered in the address book, corresponding to the received address of the external apparatus in response to receiving the image data from the external apparatus;
   setting a folder path based on the stored rule and the acquired name in response to receiving the image data from the external apparatus, wherein the set folder path includes the acquired name as a folder name of the one folder selected from the plurality of hierarchical folders; and
   storing the received image data in a folder indicated by the set folder path.

2. The image processing apparatus according to claim 1, wherein, in the setting, a folder path is set by using a default name if the received address of the external apparatus is not registered in the address book.

3. The image processing apparatus according to claim 1, wherein the received image data is stored in the folder indicated by the set folder path within the file server.

4. The image processing apparatus according to claim 3, wherein the received image data is transferred to the file server by using a file transfer protocol (FTP), a server message block (SMB), or a Web distributed authoring and versioning protocol for the WWW (WebDAV).

5. An image processing method for an image processing apparatus which includes a memory unit storing an address book which registers a name and address in association with each other, the image processing method comprising:
   storing a rule for setting a folder path which includes a plurality of hierarchical folders, wherein the rule defines that a name registered in the address book is used as a folder name of one folder selected from the plurality of hierarchical folders and, the rule is stored before receiving image data;
   receiving, from the external apparatus, image data and an address of the external apparatus;
   acquiring a name, that is registered in the address book, corresponding to the received address of the external apparatus in response to receiving image data from the external apparatus;
   setting a folder path based on the stored rule and the acquired name in response to receiving the image data from the external apparatus, wherein the set folder path includes the acquired name as a folder name of the one folder selected from the plurality of hierarchical folders; and
   storing the received image data in a folder indicated by the set folder path.

6. The image processing method according to claim 5, wherein, in the setting, a folder path is set by using a default name if the received address of the external apparatus is not registered in the address book.

7. The image processing method according to claim 5, wherein, in the storing, the image data is transferred to a file server on a network and stored in the folder indicated by the folder path within the file server.

8. The image processing method according to claim 7, wherein, in the storing, the image data is transferred to the file server by using FTP, SMB, or WebDAV.

9. A non-transitory computer-readable storage medium storing a program for causing a computer to execute an image processing method, the method comprising:

storing a rule for setting a folder path which includes a plurality of hierarchical folders, wherein the rule defines that a name registered in the address book is used as a folder name of one folder selected from the plurality of hierarchical folders, and wherein the rule is stored before receiving image data;

receiving, from the external apparatus, image data and an address of the external apparatus;

acquiring a name, that is registered in the address book, corresponding to the received address of the external apparatus in response to receiving the image data from the external apparatus;

setting a folder path based on the stored rule and the acquired name in response to receiving the image data from the external apparatus, wherein the set folder path includes the acquired name as a folder name of the one folder selected from the plurality of hierarchical folders; and storing the received image data in a folder indicated by the set folder path.

* * * * *